Figure 1:
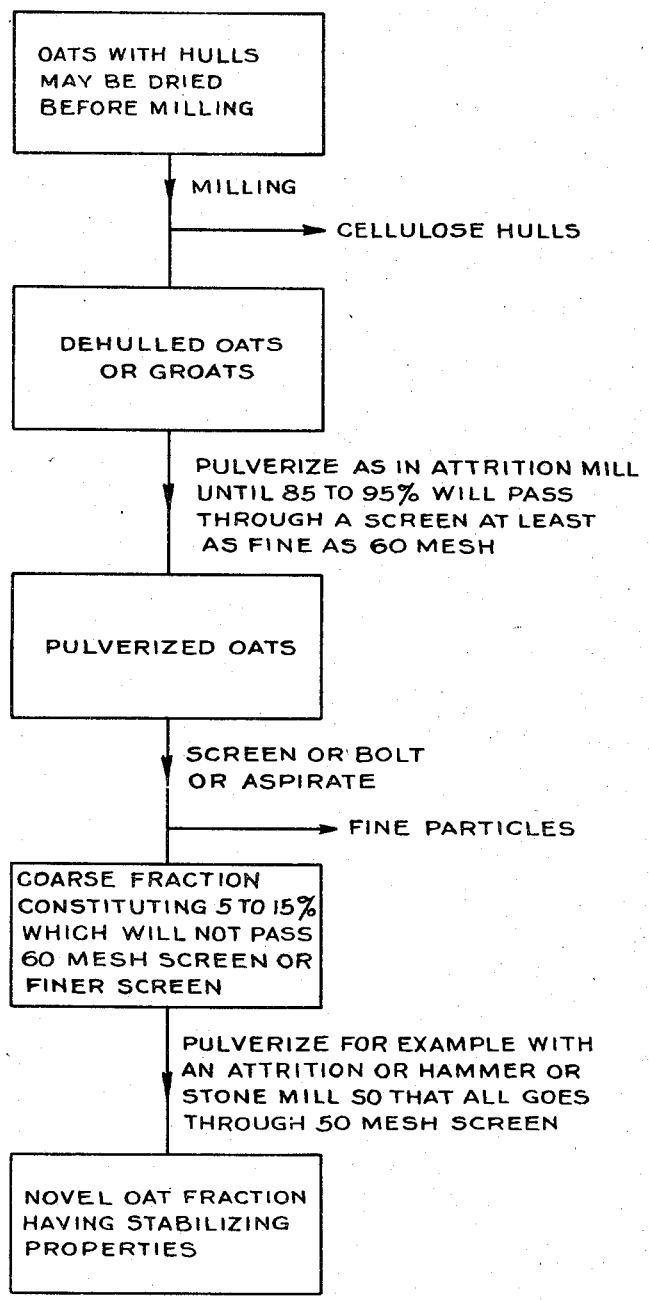

April 5, 1949.　　　S. MUSHER　　　2,466,260
METHOD OF COMMINUTING OATS TO PRODUCE
A STABILIZING MATERIAL Filed July 29, 1944　　　2 Sheets-Sheet 1

INVENTOR
Sidney Musher
BY
ATTORNEY

UNITED STATES PATENT OFFICE 2,466,260

METHOD OF COMMINUTING OATS TO PRODUCE A STABILIZING MATERIAL

Sidney Musher, New York, N. Y., assignor to Musher Foundation Incorporated, New York, N. Y., a corporation of New York Application July 29, 1944, Serial No. 547,299

8 Claims. (Cl. 241—11)

The present invention relates to methods for making stabilizers for foods and other products.

In producing food products such as ice cream, sherbets, ices, icings, cream cheese, etc. of desirable body and texture it has been customary to utilize various ingredients or combinations thereof such as gelatin, sodium alginate, algin, pectin, agar, Irish moss and psyllium seed and, to a lesser extent, products of the nature of gum tragacanth and India gum.

These materials are not only quite expensive but furthermore it is difficult to obtain in many food products a desirable combination of physical characteristics such as proper viscosity, body and texture, and, in the case of ice cream, resistance to formation of ice and lactose crystals upon holding in dealers' cabinets.

A still further object is to provide a method for making a novel oat product having unusual physical characteristics and capable of accomplishing these desired results.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a certain fraction of oats has been properly separated from the oat grain and desirably finely divided it may be incorporated as an ingredient and stabilizer in food products such as in a frozen dessert to give such food product excellent body, texture and viscosity and in the case of frozen desserts being effective in reducing ice and lactose crystal formation so that the frozen dessert will stand up for a long period of time in the dealers' cabinets and in the manufacturing plant.

These stabilizing properties are not to be found in the oat grain as a whole or in ordinary oat products as, for example, in oat flour made by grinding oat groats or in pulverized oats or oat hulls. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized desirably in an attrition mill to such an extent that about 85% to 95% will pass through a screen or mesh or bolting cloth having a fineness in excess of about 60 mesh and desirably having a fineness in excess of 70 mesh.

The oat groats are ground as indicated above and the ground groats are then separated desirably by aspirating or otherwise by screening into two fractions, namely, a coarse fraction and a fine fraction, the coarse fraction comprising the minor fraction of less than about 15% by weight and most desirably comprising 5% to 15% of the total weight of the ground oat groats and the fine fraction comprising at least 85% and most desirably between about 85% and 95% of the total weight of the ground oat groats.

It is the coarse residue which is left after such grinding and screening or bolting or particularly after aspirating which is found to have the properties most desirable for incorporation in food products such as in ice cream or other frozen desserts as the stabilizer, and the gum and stabilizing effect is most particularly observed after the coarse fraction has all been ground to a fineness of at least 50 mesh and most desirably to at least 60 mesh.

This effect is not evident or evidenced when the whole oats are ground and utilized as such or when the oat flour made by grinding oat groats is utilized as such because of the fact that other constituents therein render ineffective the unusual stabilizing or gummy properties of the ground, relatively high protein and relatively low starch containing dehulled oat fraction of the present invention. The unusual stabilizing or gummy properties described herein are obtainable only by the use of the novel oat product of the present invention, which novel oat product is obtained in accordance with the procedures outlined herein.

In the preferred procedure, the whole oats are dehulled in their "green" or undried condition, which is quite different from the operation normally utilized in dehulling procedures and particularly in the dehulling of oats. In other words, the oats are desirably not subjected to any drying or desiccating or roasting procedures as is commonly done in the treatment of whole oats before the hulls are removed.

By the term "green oats" is meant oats which are dehulled or milled without drying or desiccating or roasting and which have their original moisture content of 12% to 13%.

Where, however, the whole oats are to be dried from, for example, 12% to 13% of moisture content to 6% to 7% or less of moisture content, it is preferable for the drying operation to be carried out at a temperature not exceeding about 170° F. and preferably not exceeding about 150° F. Roasting of the oats or drying of the oats at a temperature of over 170° F. is preferably to be avoided.

The whole oats may less desirably be desiccated or dried in the normal manner by placing in open pans which are steam jacketed until they are dried to a moisture content of less than about 7% but this is a less preferable procedure.

As indicated above, the preferred procedure is to use "green" oats and by which term is included the substantially undried oats. By the use of these "green" oats and with the further processing more particularly set forth below, a greatly improved final product is obtained and a product having higher viscosity characteristics and greater physical stabilization characteristics.

The oats are then dehulled preferably without damage or change to the oat groat fraction so that only the hulls themselves are removed leaving the whole oat groat which oat groats have desirably not been subjected to a temperature in excess of 170° F. and preferably to not over 150° F.

The oat groats after removal of the hulls are then pulverized or ground and then desirably by aspirating or less preferably by bolting or screening the relatively high starch containing oat fraction is removed. The pulverized oat groats may, for example, be aspirated to separate the minor fraction of the relatively low starch and relatively high protein containing materials. This process may where desired be continued by regrinding, rescreening or reaspiration until the relatively high starch material has been largely removed leaving the relatively high protein fraction this fraction desirably to be ground to at least 60 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction.

According to one method of separating the relatively high starchy fraction which is necessary to obtain the gelatinous properties in most highly developed condition, the groats are ground so that at least about 85% will have a fineness in excess of about 60 mesh and desirably at least 60% to 70% of the ground material will have a sufficient fineness to go through about a 90 mesh screen.

Then the ground material is aspirated or less preferably screened to remove all particles which will not go through a 60 mesh screen.

A most highly desirable method is to grind the oat groats until between 85% and 90% will go through a 70 mesh screen but wherein the balance of between 10% and 15% remains on the screen. Then the ground groats are aspirated or screened to remove all the coarse particles and to separate the fine fraction comprising 85% to 90% from the coarse fraction comprising the balance of 10% to 15% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is desirably finely divided and may then be used in accordance with the procedures of the present invention, the unusual stabilizing properties now being present with the removal of the cellulosic hulls and the relatively high starch fraction of the oat groats.

These coarser particles in which the stabilizing properties are concentrated are most desirably ground such as in a hammer or stone or attrition mill to a particle size of at least 50 mesh and more desirably so that all of the coarse particles will go through at least a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

Another method that may be followed for the preparation of the special oat fraction of the present invention is to first clip the whole oats containing the hulls to remove both the hulls and the upper 10% and preferably the upper 5% as well as the lower 10% and preferably the lower 5% of the elongated fraction of the oat groats. These upper and lower fractions of the oat groats together with the oat hulls may then be aspirated to separate the hull fraction, and the upper and lower oat groat fractions which have been removed from the hulls may then be finely divided to at least about 50 mesh and desirably to about 60 mesh to produce the special oat fraction. After removal of the hulls desirably by aspiration the remaining substantially hull-free fraction may then be further aspirated or bolted to remove between about 25% and 50% of the finer fraction or the hull-free fraction may be aspirated or bolted or otherwise processed to separate the low protein fraction in order to leave behind the fraction which contains in excess of 20% and desirably in excess of 22% total protein. The high protein fraction or the coarse fraction thus obtained may then be finely divided for use in accordance with the procedures herein set forth.

Figure 2:
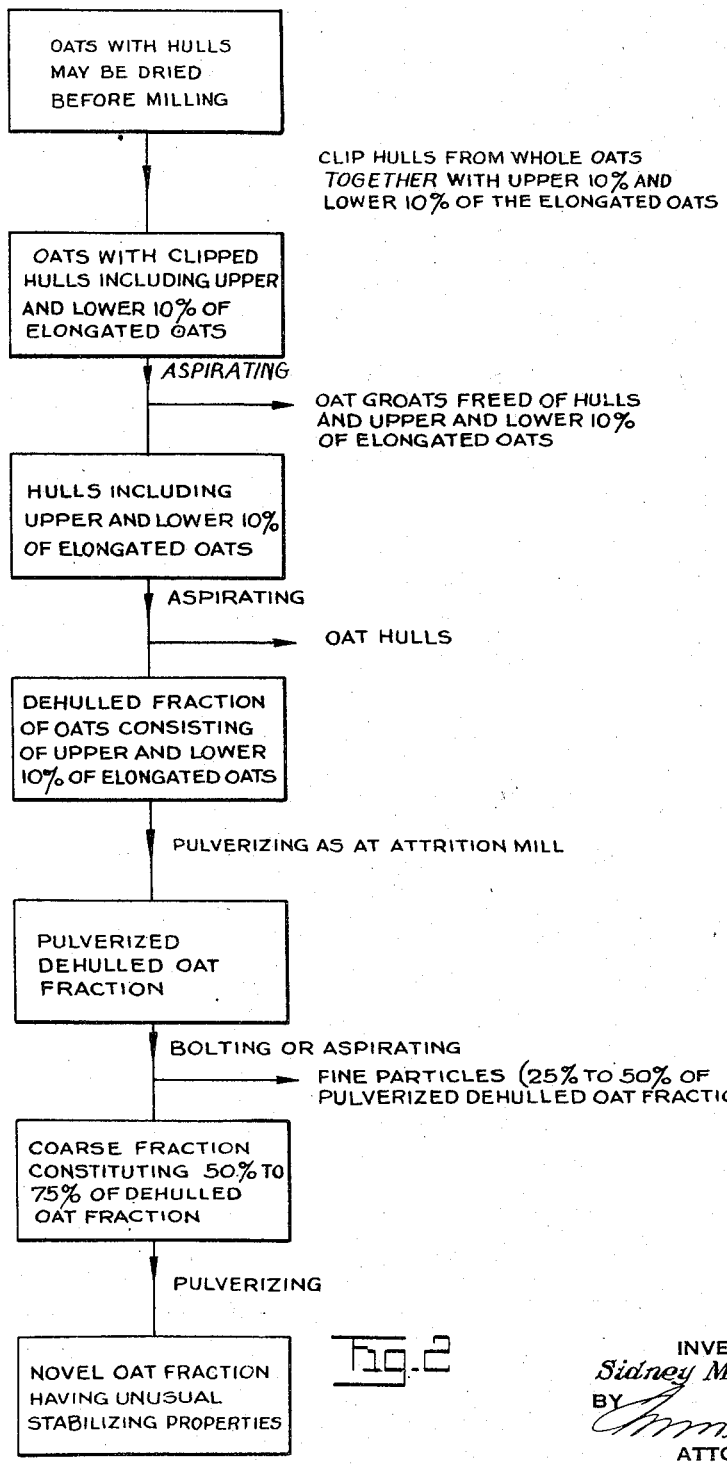

Upon the accompanying drawing, Fig. 1 shows diagrammatically a representation of a preferred procedure or process according to the present invention. Fig. 2 shows diagrammatically an alternative procedure according to the present invention.

By the term "finely divided" as used in connection with the special oat fraction of the present invention in the application and claims is meant the oat fraction which has been subdivided to a state of fineness that will enable it to go through at least about a 50 mesh screen.

The present application is a continuation in part of application, Serial No. 510,831, filed November 17, 1943 entitled Oat product, now Patent 2,355,028, issued August 1, 1944, and through said application is a continuation in part of application, Serial No. 401,967, filed July 11, 1941 entitled Water thickening agent and application, now abandoned, and Serial No. 463,651 filed October 28, 1942, now abandoned, entitled Ice cream compositions.

Having described my invention, what I claim is:

1. A method of producing a novel oat fraction having stabilizing properties which comprises dehulling oats, pulverizing the oat groats until at least about 85% to 95% thereof will have a fineness in excess of 60 mesh, aspirating the said pulverized oat groats to remove the 85% to 95% fraction consisting of the fine particles, and then finely dividing the coarse fraction consisting of 5% to 15% of the pulverized oat groats.

2. A method of producing a novel oat product which comprises dehulling oats, pulverizing the groats into two fractions, which two fractions consist of a minor proportion of coarse particles as one fraction, said coarse fraction constituting 5% to 15% of the pulverized oat groats, and a major proportion of fine particles as another fraction, said fine fraction constituting 85% to 95% of the pulverized oat groats, separating the fraction which consists of the coarse particles and then pulverizing the said coarse fraction so that the said coarse fraction will go through at least a 60 mesh screen.

3. A method of producing a novel oat fraction having stabilizing properties which comprises dehulling green oats, pulverizing the oat groats until at least about 85% to 95% thereof will have a fineness in excess of 60 mesh, aspirating the said pulverized oat groats to remove the 85% to 95% fraction consisting of the fine particles, and then finely dividing the coarse fraction consisting of 5% to 15% of the pulverized oat groats.

4. A method of producing a novel oat fraction having stabilizing properties which comprises drying whole oats to a moisture content of about 6% to 7% and at a temperature of under 170° F., dehulling the said oats, pulverizing the oat groats until at least about 85% to 95% thereof will have a fineness in excess of 60 mesh, aspirating the said pulverized oat groats to remove the 85% to 95% fraction consisting of the fine particles, and then finely dividing the coarse fraction consisting of 5% to 15% of the pulverized oat groats.

5. A method of producing a novel oat fraction having stabilizing properties which comprises clipping the hulls from whole oats together with the upper 10% and lower 10% of the elongated oats, removing the said fraction consisting of the hulls and upper and lower fractions of the elongated oats, removing the hulls from the said fraction, pulverizing the hull-free fraction, aspirating the pulverized hull-free fraction to remove between about 25% and 50% of the more finely divided particles, and then pulverizing the coarse particles, the said pulverized coarse particles being the novel oat fraction.

6. A method of producing a novel oat fraction which comprises drying whole oats to a moisture content of about 6% to 7% and at a temperature of under 170° F., clipping the hulls from the whole oats together with the upper 10% and lower 10% of the elongated oats, removing the said fraction consisting of the hulls and upper and lower fractions of the elongated oats, removing the hulls from the said fraction, pulverizing the hull-free fraction, aspirating the pulverized hull-free fraction to remove between about 25% and 50% of the more finely divided particles, and then pulverizing the coarse particles, the said pulverized coarse particles being the novel oat fraction.

7. A process of making a gum-like oat product which comprises dehulling green oats to obtain oat groats, pulverizing the oat groats until at least about 85% thereof will have a fineness in excess of about 60 mesh, separating the pulverized oat groats to remove all coarse particles which will not pass through a 60 mesh screen, and then grinding said coarse particles so that they will pass through a screen of 50 mesh and using such particles as a stabilizing material.

8. A process of making a gum-like oat product which comprises drying whole oats to about 6% to 7% moisture at a temperature not exceeding 150° F., dehulling the said dried whole oats, pulverizing the resultant oat groats until at least about 60% to 70% will have a fineness in excess of about 90 mesh, separating the pulverized oat groats to remove all coarse particles which will not pass through a 70 mesh screen, and then grinding said coarse particles until they will all pass through a 60 mesh screen, and using such particles as the stabilizing agent.

SIDNEY MUSHER.

REFERENCES CITED

The following references are of record in the file of this patent:

UNITED STATES PATENTS

| Number | Name | Date |
|---|---|---|
| 218,571 | Potts | Aug. 12, 1879 |
| 268,782 | Cormack | Dec. 12, 1882 |
| 327,250 | Foulds | Sept. 29, 1885 |
| 1,423,450 | Otterstedt | July 18, 1922 |
| 2,236,806 | Sutton | Apr. 1, 1941 |
| 2,355,028 | Musher | Aug. 1, 1944 |

OTHER REFERENCES

Cereal Chemistry, vol. 15, pp. 261-265, U. S. Dept. of Agriculture Library, Book No. 59.8, C33, Cop. 2, V15, 1938.

Modern Flour Milling by Voller, 1889 edition, U. S. Patent Office Library, Book No. TS2145, v. 924, pp. 147-149. Copy in Division 25.

Practical Miller, by Dedrick, published by National Miller, Chicago, Ill., 1st edition, page 184, U. S. Patent Office Library, Book No. TS2145 D4. Copy in Division 25.